Dec. 1, 1953 L. L. BRUNK Re. 23,749

DISTRIBUTOR PLATE

Original Filed Oct. 28, 1949 2 Sheets-Sheet 1

INVENTOR.
LESLIE L. BRUNK
BY
Joseph H. Kennington
HIS ATTORNEY

DISTRIBUTOR PLATE

Original Filed Oct. 28, 1949 2 Sheets-Sheet 2

INVENTOR.
LESLIE L. BRUNK
BY
Joseph G. Denny
HIS ATTORNEY

Reissued Dec. 1, 1953

Re. 23,749

UNITED STATES PATENT OFFICE 23,749

DISTRIBUTOR PLATE

Leslie L. Brunk, Detroit, Mich., assignor to Renberles Products Co., Detroit, Mich., a corporation of Michigan Original No. 2,617,899, dated November 11, 1952, Serial No. 124,008, October 28, 1949. Application for reissue May 28, 1953, Serial No. 358,222

12 Claims. (Cl. 200—31)

Figure 1:
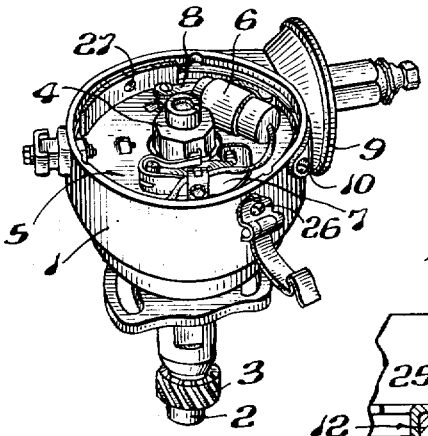

Matter enclosed in heavy brackets [ ] appears in the original patent but forms no part of this reissue specification; matter printed in italics indicates the additions made by reissue.

My invention is an improved distributor plate unit for use in internal combustion engine distributors having a vacuum advance spark mechanism which rotates the distributor plate.

In order to obtain maximum efficiency from an internal combustion engine using a spark ignition system it is necessary that the spark be advanced or retarded to suit the condition of engine load at any given moment. As the load varies the spark ignition timing must be varied, for maximum efficiency, so that the combustion in the cylinder is substantially complete just prior to the completion of the compression stroke of the piston. Conventionally, this variation in the spark timing is achieved by measuring the amount of vacuum existing at the manifold end translating this condition of vacuum into spark advance or retardation.

A convenient means of translating the amount of vacuum into spark advance is by running a vacuum line from the carburetor side of the manifold to a housing located on the side of the distributor in which is mounted a diaphragm subject to actuation by variations of the vacuum and by a calibrated return spring. One side of the diaphragm is open to the vacuum line. The other side of the diaphragm is connected by means of a rod or other suitable means to a rotatable distributor plate located within the distributor housing. The movement of the diaphragm is thus transmitted to the distributor plate and causes the distributor plate to rotate about its axis which produces a relative movement between the circuit breaker and the breaker cam. Thus, variations of vacuum causes the spark to be transmitted to each of the cylinders at the proper time so that combustion is substantially complete at the end of the compression stroke under all engine loads.

This rotation of the distributor plate in both directions is continuous where the engine is subject to variations in engine load as, for instance, where the vehicle is being driven through heavy traffic. This continuous movement tends to rapidly wear the three bearing points from which the conventional distributor plate is supported. The wear of the bearing points or the recess in which they move tends to displace the distributor plate both vertically and horizontally resulting in a condition of "flutter" or tilt and misalignment which varies the cam angle and timing curve so that the spark advance is not properly regulated and poor engine performance results.

It is an object of my invention to remove this common cause of poor engine performance by using a distributor plate unit which, by its construction and design, will permit of no "flutter" or tilt or vertical movement ar 1 which initially can be accurately aligned and which alignment cannot thereafter be changed by normal movement of the distributor plate.

Another object of my invention is to provide a distributor plate which can be quickly and easily substituted for the original plate in an old distributor, *and which will last for the life of the engine.*

Another object of my invention is to provide friction-free movement of the distributor plate and freedom from tilt thereby assuring constant cam angle and correct timing curve over the entire range of engine speed and vacuum conditions.

It is another object of my invention to provide *easier starting,* better acceleration, and smoother idling of the engine.

It is also an object of my invention to provide an assembly plate unit which will necessitat- no change in original timing or cam angle specifications where the distributor plate unit is used in an old distributor.

*A still further object is to provide for better economy of operation of the engine, maximum efficiency, and better coil and condenser action.*

*Still another object is the provision of a distributor plate having substantially universal application, and including sealed-in bearings which insure rigid alignment, long life, and ease of installation.*

*The objects referred to above are, in general, attained by constructing a distributor plate having a stationary part secured to the distributor housing and a movable part rotatable on the stationary part and supported thereon by an antifriction bearing, preferably a ball bearing. While this construction of a distributor plate enables the foregoing objects to be attained it, nevertheless, introduces certain problems, particularly in connection with keeping the antifriction bearing clean at all times and preventing the entrance into the race-ways thereof of foreign material that might readily inhibit movement of the movable part of the distributor plate sufficiently that the distributor plate might become nonresponsive to at least small changes in vacuum applied to the actuating diaphragm. Such foreign material, which mostly falls into the bearing from above, will also lead to jumping and erratic movement of the movable part of the distributor plate which will materially detract from the efficiency of the engine.*

The principles and characteristic features of my invention and the manner of making and constructing and using my improved distributor plate unit will further appear in the accompanying drawings and the following description explaining the best modes in which I have contemplated using such principle.

Figure 6:
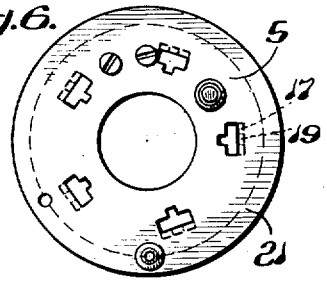
Figure 7:
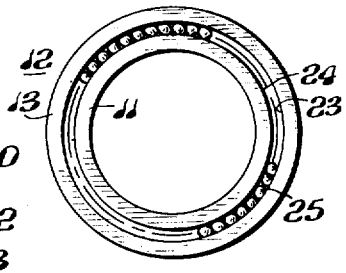
Figure 4:
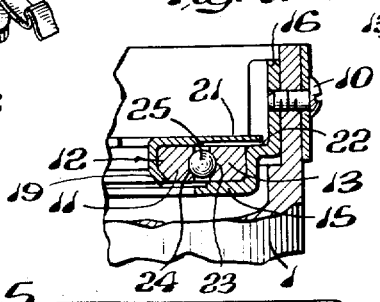
Figure 8:
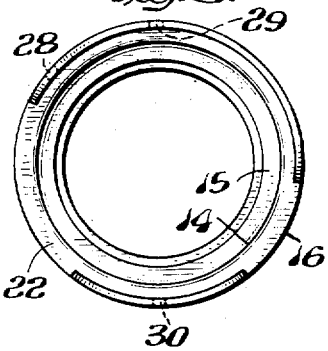
Figure 5:
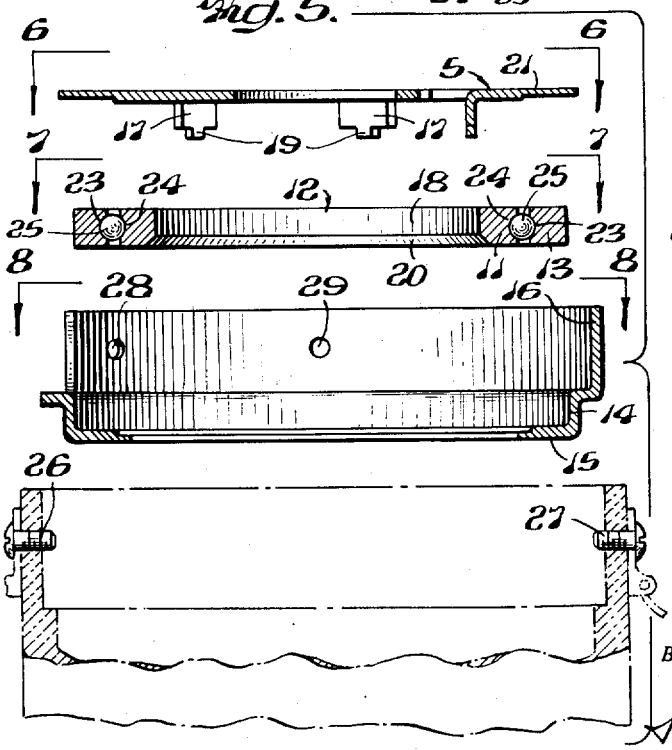
Figure 2:
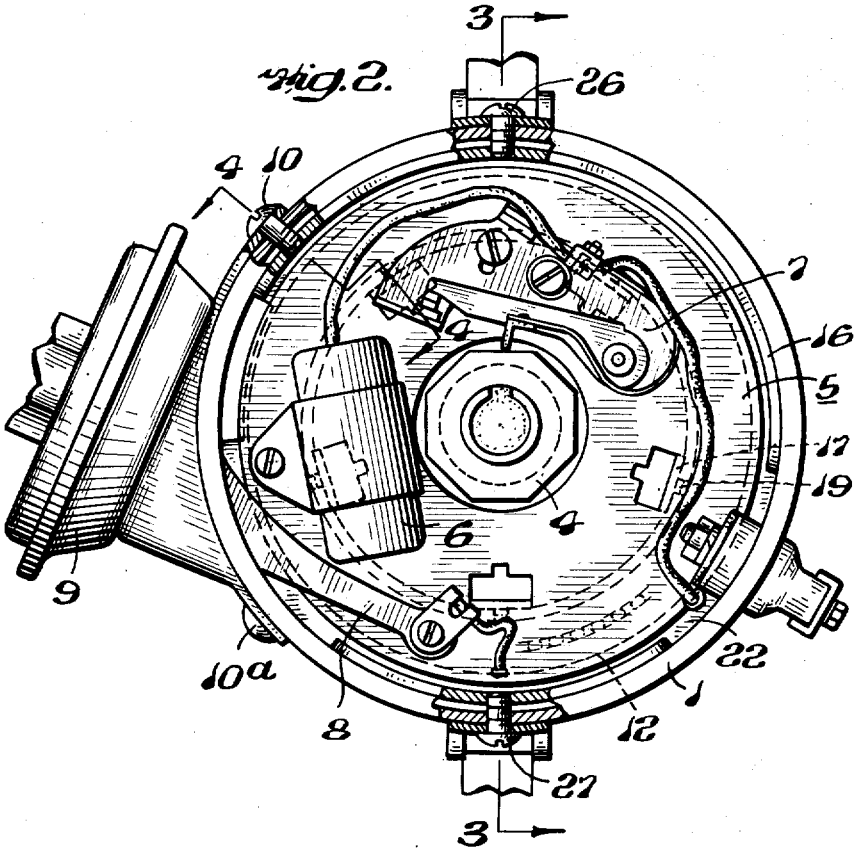
Figure 3:
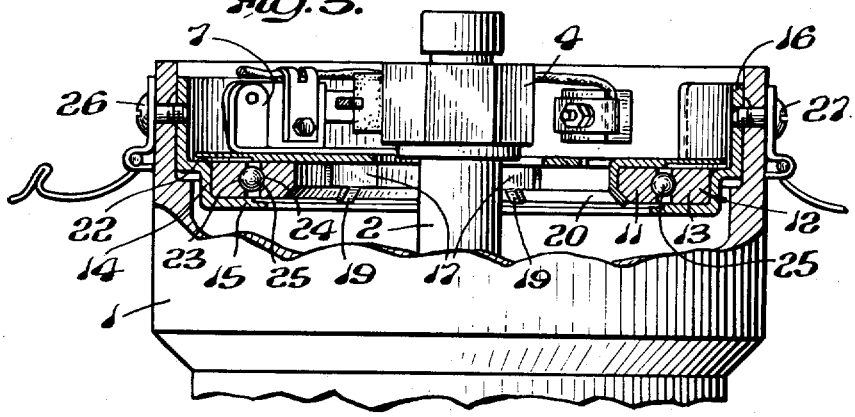

*In the drawings,* Fig. 1 is a perspective view of a distributor, with cap removed, embodying my invention; Figure 2 is a top plan view of the distributor partly in cross-section; Figure 3 is a fragmentary side elevational view of the distributor partly in cross-section taken along the line 3—3 of Fig. 2; Fig. 4 is a fragmentary cross-sectional view of my new distributor plate unit and distributor housing taken along the line 4—4 of Fig. 2; Fig. 5 is an exploded view of the parts comprising the distributor plate unit; Fig. 6 is a plan view of the top of the distributor plate; Fig. 7 is a plan view of the ball-bearing ring; Fig. 8 is a plan view of the support ring.

The distributor embodying my new distributor plate unit comprises a housing 1 in which is rotatably mounted a cam shaft 2 rotated by a gear 3 having conventional geared connections with the engine proper. The upper part of the cam shaft 2 carries the usual cam breaker 4 and provision is made for the mounting of a rotating contact, not shown, which makes contact with a distributor cap, not shown.

Secured to the distributor or breaker plate 5 by screws are the condenser 6 and the circuit breaker mechanism 7 together with one end of an arm 8 whose other end is connected to a vacuum actuated diaphragm mounting in the housing 9 which is secured to the distributor housing by screws 10 and 10a.

The distributor plate 5 is connected with and rides upon the inner ring 11 of the ball-bearing ring 12. The outer ring 13 of the ball-bearing ring 12 is seated in and firmly held by the inner periphery 14 and lower flange 15 of the supporting ring 16. The supporting ring 16 is in turn securely fastened to the inner face of the housing 1 by means of screws or bolts fastened to the housing.

The outer ring 13 of the ball-bearing ring 12 is shrunk-fit to the inner periphery 14 with sufficient adherence so that no force capable of being transmitted by the vacuum actuated diaphragm mounted in the housing 9 can force the outer ring 13 out of position relative to the periphery 14 or displace the support ring 16 relative to the housing 1.

*It will be apparent, however, that for most purposes there does not need to be a force-fitting of the bearing to the distributor plate parts, but a mere close fit will produce satisfactory operation.*

To secure the distributor plate 5 to the inner ring 11, a series of perforations are made in the plate 5 to form downwardly depending lobes 17 which are press-fitted to the inner peripheral surface 18 of the ring 11. Teats 19 formed on the ends of the lobes 17 are pressed into engagement with the beveled edge 20 of the ring 11. Thus, the plate 5 cannot move relative to the ring 11 but can only move in conjunction therewith.

*As in the case of the connection of the outer race with the stationary plate, the connection of the inner race of the bearing to the rotatable plate is subject to considerable variation within the scope of this invention so long as the important considerations are observed of fixing the rotatable plate to the inner race in a predetermined position relative thereto so that the rotatable plate is accurately supported on the stationary plate, and there is no relative movement between either of the plates and their pertaining races circumferentially which would introduce inaccuracy of support of the rotatable plate or excessive wear leading to inaccuracy of the support thereof.*

The outer portion 21 of the distributor plate 5 overlies the ball-bearing ring 12 and partially overlies the horizontal surface 22, being part of the support ring 16, thereby preventing dirt or foreign matter from entering and clogging the races 23 and 24, formed on the inner facing surfaces of the rings 11 and 13, or from depositing on the ball-bearings 25. The under-portion of the ball-bearing ring 12 is shielded from dirt or foreign matter by the overlapping of the flange 15 which extends completely over the entrance to the ball-bearing races 23 and 24 and partly over the inner ring 11.

*It will be apparent that the arrangement disclosed in the present application for sealing the ball-bearing against the entrance of foreign material is but one such device that can be employed to effect this result. For example, the large diameter ball-bearing illustrated in the drawings could be replaced by a smaller size bearing, which embodied at least one sealing ring in the bearing structure and which side of the bearing would normally be placed downwardly, with the upper portion of the bearing being sealed, as in the case of the plate illustrated, by the rotary part of the distributor plate extending thereover. Certain economical advantages would obtain from this type of construction, but it will be apparent that such an arrangement would not depart from the basic principle of this invention of supporting the movable part of the distributor plate so that it would be extremely sensitive to changes in vacuum on the actuating diaphragm.*

*Due to the extreme sensitivity required in a distributor constructed according to this invention, the sealing of the bearing is essential to obtain a long and satisfactory service-life. This sealing, while it can be accomplished by enclosing mechanically the space between the inner and outer races of the bearings, it also can be effectively accomplished by establishing a grease or oil seal which is, in effect, a labyrinth-type seal and which is established by grease or oil bridging between the races of the bearing, or between one race and the supporting member for the other race, or between the supporting members for the two races, and which bridging over by the oil or grease provides a trap which will retain any dust or foreign particles that come to the bridge, thus forming an effective seal that will positively exclude foreign material from the bearings.*

The ball-bearings 25 are in diameter somewhat less than the depth of the rings 11 and 13 but completely fill the peripheral length of the races 23 and 24 thereby providing a great number of bearing surfaces over which the load is distributed so as to provide minimum pressure at any one point.

*The large diameter bearing illustrated in the drawings, in combination with the small labyrinth bearings employed therein, has the advantage of simplifying the sealing of the bearing while providing for a bearing exhibiting very low friction, but it will be apparent that a bearing having smaller races and larger balls could be employed in place of the bearing illustrated provided suitable sealing means of the nature referred to above*

*were provided, and the net result would be a distributor plate exhibiting the principal advantageous operating characteristics of the distributor plate arrangement of the present invention.*

The periphery of the distributor plate 5 overlying the outer ring 13 and the horizontal surface 22 is raised slightly to provide adequate clearance between the parts. Similarly, the innermost portion of the flange 15 which fits under the inner ring 11 is depressed slightly so as to provide proper clearance of the parts. In operation, therefore, the plate 5 turns on ball-bearings 25 which are completely shielded from dust and dirt and which by their sign and number so distribute the pressure load as to provide friction free movement of the distributor plate. The distributor plate is thus free to respond to the slightest change in manifold vacuum thereby assuring maximum performance of the engine at all engine loadings and an accurate timing curve under all vacuum conditions.

The distribution of the load on the plate 5 over a great many pressure points eliminates for practical purposes any wear of the moving parts thus assuring constant cam angle under all engine conditions and also eliminates the cause of plate flutter.

The distributor plate unit composed of the distributor plate 5, ball-bearing ring 12 and supporting ring 16 can be readily inserted in an old distributor housing. The procedure for so doing is to remove the old distributor plate together with the screws 10, 26 and 27. My distributor plate unit is then placed inside the housing and the holes 28, 29 and 30 in the support ring 16 are aligned with the holes in the housing from whence the screws 10, 26 and 27, or slightly longer ones, are then reinserted and after the condenser, breaker mechanism and arm 8 have been transferred from the old to the new distributor plate, the distributor is once again ready to operate. The holes 28, 29 and 30 have been so placed that for any given distributor the distributor plate unit is properly aligned once the screws are replaced as aforesaid.

*The arrangement described above for securing the distributor plate unit inside the distributor housing is the preferred arrangement, but does not, by any means, represent the only device that could be employed for effecting a suitably rigid and stationary anchoring of the stationary portion of the distributor plate unit precise location within the distributor housing. For example, the upstanding peripheral flange on the stationary plate could be eliminated and other means, such as brackets or spaced individual tabs on the stationary plate, be provided for mounting the distributor plate, and, so long as the stationary plate was supported stationarily and in a predetermined position, the same operating advantages would obtain as with the preferred modification illustrated in the drawings.*

*It is to be understood that modification of the device may be necessary to adapt it to particular circumstances, and such changes are intended to be included in this invention as defined by the appended claims.*

I claim:

1. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower steps, said distributor plate having means rigidly attaching the same to said rotary raceway, said plate having an outer portion overlying both raceways and partially overlying the horizontal portion of said upper step, and said horizontal portion of the lower step extending across the space between and below said raceways whereby said plate outer portion and said last named step horizontal portion protect against the entrance of extraneous matter to said raceway grooves and ball bearings, said ball bearings being concentrically mounted with relation to said shaft when said supporting ring is attached to said housing.

2. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower step, said distributor plate having means rigidly attaching the same to said rotary raceway, said plate having an outer portion overlying both raceways and partially overlying the horizontal portion of said upper step, and said horizontal portion of the lower step extending across the space between and below said raceways whereby said plate outer portion and said last named step horizontal portion protect against the entrance of extraneous matter to said raceway grooves and ball bearings, said ball bearings being concentrically mounted with relation to said shaft when said supporting ring is attached to said housing, said means attaching said ring to said housing comprising an upper extension and a plurality of spaced screw threaded means for attaching said extension to said housing.

3. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower step, said distributor plate having means rigidly attaching the same to said rotary raceway, said plate having an outer portion overlying both raceways and partially overlying the horizontal portion of said upper step, and said horizontal portion of the lower step extending across the space between and below said raceway whereby said plate outer portion and said last named step horizontal portion protect against the entrance of extraneous matter to said raceway grooves and ball bearings, said ball bearing being concentrically mounted with relation to said shaft when said supporting ring is attached to said housing, said means attaching said distributor plate to said rotary raceway comprising a plurality of depending lobes.

4. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower step, said distributor plate having means rigidly attaching the same to said rotary raceway, said plate having an outer portion overlying both raceways and partially overlying the horizontal portion of said upper step, and said horizontal portion of the lower step extending across the space between and below said raceway whereby said plate outer portion and said last named step horizontal portion protect against the entrance of extraneous matter to said raceway grooves and ball bearings, said ball bearing being concentrically mounted with relation to said shaft when said supporting ring is attached to said housing, said means attaching said distributor plate to said rotary raceway comprising a plurality of depending lobes, struck from said distributor plate.

5. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower step, said distributor plate having means rigidly attaching the same to said rotary raceway, said plate having an outer portion overlying both raceways and partially overlying the horizontal portion of said upper step, and said horizontal portion of the lower step extending across the space between and below said raceway whereby said plate outer portion and said last named step horizontal portion protect against the entrance of extraneous matter to said raceway grooves and ball bearings, said ball bearing being concentrically mounted with relation to said shaft when said supporting ring is attached to said mounting, said means attaching said distributor plate to said rotary raceway comprising a plurality of depending lobes, having a press-fit with said rotary raceway.

6. A rotor mechanism for attachment to a distributor housing in which is rotatably mounted a camshaft, a supporting ring, means attaching said ring to said housing, a ball bearing comprising an inner rotary raceway, and an outer stationary raceway each having a groove and ball bearings in the grooves of said raceways, a distributor plate, said supporting ring having upper and lower steps each consisting of horizontal and substantially vertical circular portions, said stationary raceway being supported on the horizontal portion of the lower step, said distributor plate having means rigidly attaching the same to said rotary raceway, said plate having an outer portion overlying both raceways and partially overlying the horizontal portion of said upper step, and said horizontal portion of the lower step extending across the space between and below said raceway whereby said plate outer portion and said last named step horizontal portion protect against the entrance of extraneous matter to said raceway grooves and ball bearings, said ball bearing being concentrically mounted with relation to said shaft when said supporting ring is attached to said housing, said means attaching said distributor plate to said rotary raceway comprising a plurality of depending lobes, teats formed on the ends of said lobes having a press-fit with said rotary raceway.

*7. A rotor mechanism for attachment to a distributor housing in which is rotatably mounted a cam shaft, a supporting member, means attaching said supporting member to said distributor housing, a ball bearing comprising an inner rotary raceway and an outer stationary raceway, each having a groove and ball bearings in the grooves of said raceways, a distributor plate, said supporting member having horizontal portions and at least one substantially vertical circular portion, said stationary raceway being located within said vertical portion and supported on one of said horizontal portions of said supporting member, said distributor plate having means rigidly attaching the same to said rotary raceway, said plate having an outer portion overlying both raceways of the ball bearing and the upper of said horizontal portions of said supporting member, said ball bearing being concentrically mounted with relation to said cam shaft when said supporting member is attached to said housing.*

*8. A rotor mechanism for attachment to a distributor housing in which is rotatably mounted a cam shaft, a supporting member, means attaching said supporting member to said distributor housing, a ball bearing comprising an inner rotary raceway and an outer stationary raceway, each having a groove and ball bearings in the grooves of said raceways, a distributor plate, said supporting member having horizontal portions and at least one substantially vertical circular portion, said stationary raceway being located within said vertical portion and supported on one of said horizontal portions of said supporting member, said distributor plate having means rigidly attaching the same to said rotary raceway, said plate having an outer portion overlying both raceways of the ball bearing and the upper of said horizontal portions of said supporting member, said ball bearing being concentrically mounted with relation to said cam shaft when said supporting member is attached to said housing, said means attaching said distributor plate to said rotary raceway comprising bracket means.*

*9. A rotor mechanism for attachment to a distributor housing in which is rotatably mounted a camshaft, a supporting means, means attaching said supporting means to said housing, a ball bearing comprising an inner rotary raceway, and an outer stationary raceway each having a groove and ball bearings in the grooves of said raceways, a distributor plate, said supporting means having upper and lower steps each consisting of horizontal and substantially vertical circular portions, said stationary raceway being supported on the horizontal portion of the lower steps, said distributor plate having means rigidly attaching the same to said rotary raceway, said plate having an outer portion overlying both raceways and partially overlying the horizontal portion of said upper step, and said horizontal portion of the lower step extending below at least one of said raceways whereby said plate outer portion pro-*

*tects against the entrance of extraneous matter to said raceway grooves and ball bearings, said ball bearing being concentrically mounted with relation to said shaft when said supporting means is attached to said housing.*

*10. A rotor mechanism for attachment to a distributor housing in which is rotatably mounted a cam shaft, a supporting member, means attaching said supporting member to said housing, a ball bearing comprising an inner rotary raceway, and an outer stationary raceway each having a groove and ball bearings in the grooves of said raceways, a distributor plate, said supporting member having upper and lower steps each consisting of horizontal and substantially vertical circular portions, said stationary raceway being supported on the horizontal portion of the lower steps, said distributor plate having means rigidly attaching the same to said rotary raceway, said plate having an outer portion overlying both raceways and partially overlying the horizontal portion of said upper step, and said horizontal portion of the lower step extending below at least one of said raceways whereby said plate outer portion protects against the entrance of extraneous matter to said raceway grooves and ball bearings, said ball bearing being concentrically mounted with relation to said shaft when said supporting member is attached to said housing.*

*11. A rotor mechanism for attachment to a distributor housing in which is rotatably mounted a cam shaft, a supporting means including a plurality of spaced vertically extending members, means attaching said supporting means to said distributor housing, a ball bearing comprising an inner rotary raceway and an outer stationary raceway, each having a groove and ball bearings in the grooves of said raceway, a distributor plate, said supporting means further including horizontal portions and a vertical circular portion located below said vertical members first mentioned, said stationary raceway being mounted on one of said horizontal portions of said supporting means and within the said circular vertical portions thereof, said distributor plate having means rigidly attaching the same to said rotary raceway, said plate having an upper portion overlying both raceways of the ball bearing, said ball bearing being concentrically mounted with relation to said cam shaft when said supporting means is attached to said housing.*

*12. A rotor mechanism for attachment to a distributor housing in which is rotatably mounted a cam shaft, a supporting means including a plurality of spaced vertically extending members, means attaching said supporting means to said distributor housing, a ball bearing comprising an inner rotary raceway and an outer stationary raceway, each having a groove and ball bearings in the grooves of said raceway, a distributor plate, said supporting means further including horizontal portions and a vertical circular portion located below said vertical members first mentioned, said stationary raceway being mounted on one of said horizontal portions of said supporting means and within the said circular vertical portions thereof, said distributor plate having means rigidly attaching the same to said rotary raceway, said plate having an upper portion overlying both raceways of the ball bearing, and at least one of said horizontal portions of said supporting means, said ball bearing being concentrically mounted with relation to said cam shaft when said supporting means is attached to said housing.*

LESLIE L. BRUNK.

References Cited in the file of this patent or the original patent

UNITED STATES PATENTS

| Number | Name | Date |
|---|---|---|
| 1,684,652 | White | Sept. 18, 1928 |
| 2,011,192 | Comstock | Aug. 13, 1935 |
| 2,023,718 | Adams | Dec. 10, 1935 |
| 2,075,904 | Lang et al. | Apr. 6, 1937 |
| 2,085,817 | Melcher et al. | July 6, 1937 |
| 2,131,019 | Arthur et al. | Sept. 27, 1938 |
| 2,303,464 | Hove | Dec. 1, 1942 |
| 2,347,483 | Katcher | Apr. 25, 1944 |
| 2,489,775 | Haubert | Nov. 29, 1949 |
| 2,504,439 | McKenna | Apr. 18, 1950 |